(12) United States Patent
Langille et al.

(10) Patent No.: US 10,077,810 B2
(45) Date of Patent: Sep. 18, 2018

(54) SENSOR HUB COMPRISING A ROTATION ENCODER

(71) Applicant: Dynapar Corporation, Gurnee, IL (US)

(72) Inventors: Mark Edward Langille, Lindenhurst, IL (US); Kirk Alan Mitchell, Escondido, CA (US); Erik John Brewster, Sunnyvale, CA (US); Abhishek Sumeet Jadhav, Bayside, WI (US); Ferran Alberto Ayala, Chicago, IL (US); Scott Thomas Benigni, Wilmette, IL (US)

(73) Assignee: Dynapar Corporation, Gurnee, IL (US)

(*) Notice: Subject to any disclaimer, the term of this patent is extended or adjusted under 35 U.S.C. 154(b) by 0 days.

(21) Appl. No.: 14/686,220

(22) Filed: Apr. 14, 2015

(65) Prior Publication Data

US 2015/0294552 A1    Oct. 15, 2015

Related U.S. Application Data

(60) Provisional application No. 61/979,025, filed on Apr. 14, 2014.

(51) Int. Cl.
*F16C 41/00* (2006.01)
*H04W 4/70* (2018.01)
(Continued)

(52) U.S. Cl.
CPC ............ *F16C 41/007* (2013.01); *H04L 67/12* (2013.01); *H04W 4/005* (2013.01); *H04W 4/70* (2018.02)

(58) Field of Classification Search
CPC ... G08B 21/187; G08B 21/182; F16C 41/007; F16C 17/03; F16C 19/52; F16C 27/02;
(Continued)

(56) References Cited

U.S. PATENT DOCUMENTS 4,416,145 A   11/1983   Goodman et al.
4,823,600 A   4/1989   Biegel et al.
(Continued)

FOREIGN PATENT DOCUMENTS

EP    1097363 B1    12/2007
EP    2725370 A1    4/2014
WO    2008116966 A2   10/2008

OTHER PUBLICATIONS

International Search Report and Written Opinion filed in PCT/US2015/025726, dated Jul. 24, 2015, 13 pages.

*Primary Examiner* — Hirdepal Singh
(74) *Attorney, Agent, or Firm* — Moreno IP Law LLC (57) ABSTRACT

A sensor hub for use in machine condition monitoring comprising a rotation sensor and a wireless communication module each operatively connected to a processing device. The rotation sensor and processing device are configured to receive power from a controller of the monitored machine. One or more additional sensors, which may be associated with the monitored machine or another machine, may also be operatively connected to the processing device. In an embodiment, the additional sensors may comprise any one or more of, or any combination of, an accelerometer, a temperature sensor, an acoustic sensor, an high frequency sensor, an humidity sensor, a barometric pressure sensor, a current sensor or a proximity sensor. The wireless communication module may support an ad hoc wireless communication protocol. Further, the wireless communication module may receive additional sensor data from one or more
(Continued)

wireless sensor nodes associated with the monitored machine or another machine.

18 Claims, 4 Drawing Sheets

(51) Int. Cl.
 *H04L 29/08* (2006.01)
 *H04W 4/00* (2018.01)
(58) Field of Classification Search
 CPC .............. F16C 32/0402; F16C 32/0406; F16C 32/0442; F16C 32/06; F16C 33/667; F16C 39/02; F16C 41/00; F16C 41/004; H04W 4/70; H04W 4/005; H04L 67/12
 USPC ........................................................ 340/679
 See application file for complete search history.

(56) References Cited

U.S. PATENT DOCUMENTS

| | | | |
|---|---|---|---|
| 5,479,571 A | 12/1995 | Parlos et al. | |
| 5,679,900 A | 10/1997 | Smulders | |
| 5,845,230 A | 12/1998 | Lamberson | |
| 5,854,553 A | 12/1998 | Barclay et al. | |
| 5,955,670 A | 9/1999 | Goodman et al. | |
| 6,006,164 A | 12/1999 | McCarty et al. | |
| 6,014,598 A | 1/2000 | Duyar et al. | |
| 6,087,796 A | 7/2000 | Canada et al. | |
| 6,257,066 B1 | 7/2001 | Chandler et al. | |
| 6,262,550 B1 | 7/2001 | Kliman et al. | |
| 6,298,308 B1 | 10/2001 | Reid et al. | |
| 6,339,961 B1 | 1/2002 | Goodman et al. | |
| 6,341,518 B1 | 1/2002 | Goodman et al. | |
| 6,393,373 B1 | 5/2002 | Duyar et al. | |
| 6,415,645 B2 | 7/2002 | Goodman et al. | |
| 6,484,109 B1 | 11/2002 | Lofall | |
| 6,489,884 B1 | 12/2002 | Lamberson et al. | |
| 6,529,135 B1 | 3/2003 | Bowers et al. | |
| 6,590,362 B2 | 7/2003 | Parlos et al. | |
| 6,713,978 B2 | 3/2004 | Parlos et al. | |
| 6,751,575 B2 | 6/2004 | Lenz et al. | |
| 6,774,601 B2 | 8/2004 | Schwartz et al. | |
| 6,789,025 B2 | 9/2004 | Boerhout | |
| 6,822,839 B2 | 11/2004 | Habetler | |
| 6,834,256 B2 | 12/2004 | House et al. | |
| 6,839,660 B2 | 1/2005 | Eryurek et al. | |
| 6,888,124 B1 | 5/2005 | Smith | |
| 6,963,862 B1 | 11/2005 | Parlos et al. | |
| 7,024,335 B1 | 4/2006 | Parlos | |
| 7,075,327 B2 | 7/2006 | Dimino et al. | |
| 7,117,125 B2 | 10/2006 | Dimino et al. | |
| 7,142,990 B2 | 11/2006 | Bouse et al. | |
| 7,231,319 B2 | 6/2007 | Dimino et al. | |
| 7,246,069 B1 | 7/2007 | O'Hanlon et al. | |
| 7,289,919 B2 | 10/2007 | Boerhout | |
| 7,336,455 B2 | 2/2008 | Dimino et al. | |
| 7,346,475 B2 | 3/2008 | Dimino et al. | |
| 7,444,265 B2 | 10/2008 | Havela et al. | |
| 7,479,876 B2 | 1/2009 | Carle et al. | |
| 7,509,537 B1 | 3/2009 | Jensen et al. | |
| 7,539,549 B1 | 5/2009 | Discenzo et al. | |
| 7,539,597 B2 | 5/2009 | Wegerich et al. | |
| 7,561,200 B2 | 7/2009 | Garvey, III et al. | |
| 7,593,784 B2 | 9/2009 | Carle et al. | |
| 7,646,308 B2 | 1/2010 | Paoletti et al. | |
| 7,676,285 B2 | 3/2010 | Hoyte et al. | |
| 7,756,678 B2 | 7/2010 | Bonissone et al. | |
| 7,769,149 B2 | 8/2010 | Berkman | |
| 7,777,516 B2 | 8/2010 | Zhou et al. | |
| 7,847,580 B2 | 12/2010 | Zhou et al. | |
| 7,873,581 B2 | 1/2011 | Flickinger et al. | |
| 7,882,394 B2 | 2/2011 | Hosek et al. | |
| 7,928,833 B2 | 4/2011 | Bibelhausen et al. | |
| 7,996,337 B2 | 8/2011 | Flickinger | |
| 8,049,637 B2 | 11/2011 | Tompkins et al. | |
| 8,174,402 B2 | 5/2012 | Bouse et al. | |
| 8,248,215 B2 | 8/2012 | Bibelhausen et al. | |
| 8,255,240 B2 | 8/2012 | O'Hanlon et al. | |
| 8,290,630 B2 | 10/2012 | Lakomiak et al. | |
| 8,352,216 B2 | 1/2013 | Subbu et al. | |
| 8,356,207 B2 | 1/2013 | Hosek et al. | |
| 8,370,109 B2 | 2/2013 | Van Dyke et al. | |
| 8,509,935 B2 | 8/2013 | Hoyte et al. | |
| 8,578,772 B2 | 11/2013 | Becker et al. | |
| 8,665,104 B2 | 3/2014 | Heda et al. | |
| 8,700,353 B2 | 4/2014 | Khazanov | |
| 8,707,193 B2 | 4/2014 | Khazanov et al. | |
| 8,707,785 B2 | 4/2014 | Goodman et al. | |
| 8,725,451 B2 | 5/2014 | Whitefield, II | |
| 8,746,068 B2 | 6/2014 | Goodman et al. | |
| 9,878,719 B2 * | 1/2018 | Carter | B60W 30/188 |
| 2003/0093188 A1 | 5/2003 | Morita et al. | |
| 2003/0110860 A1 | 6/2003 | Okada | |
| 2004/0039478 A1 | 2/2004 | Kiesel | |
| 2005/0013244 A1 | 1/2005 | Parlos | |
| 2005/0091004 A1 | 4/2005 | Parlos et al. | |
| 2006/0085091 A9 | 4/2006 | Kiesel | |
| 2009/0096405 A1 | 4/2009 | Flickinger et al. | |
| 2009/0301224 A1 | 12/2009 | Sihler et al. | |
| 2010/0274441 A1 | 10/2010 | Carresjo | |
| 2011/0035491 A1 | 2/2011 | Gelvin et al. | |
| 2011/0316691 A1 | 12/2011 | Pepin | |
| 2012/0080883 A1 * | 4/2012 | Hobdy | F03B 13/20 290/53 |
| 2012/0126738 A1 | 5/2012 | Li et al. | |
| 2012/0216631 A1 | 8/2012 | Huhnd et al. | |
| 2012/0226474 A1 | 9/2012 | Trejo Sanchez et al. | |
| 2012/0259497 A1 * | 10/2012 | Yamamoto | E02F 9/123 701/22 |
| 2012/0274473 A1 * | 11/2012 | Heda | G01H 1/006 340/683 |
| 2012/0316796 A1 | 12/2012 | Goodman et al. | |
| 2013/0063262 A1 | 3/2013 | Shaikh et al. | |
| 2013/0173202 A1 | 7/2013 | Boerhout | |
| 2013/0300574 A1 * | 11/2013 | Gillette, II | G01N 33/0009 340/870.01 |
| 2014/0039817 A1 | 2/2014 | Dayan | |
| 2014/0103849 A1 | 4/2014 | Lalonge | |
| 2014/0117059 A1 | 5/2014 | Piety et al. | |
| 2014/0121996 A1 | 5/2014 | Piety et al. | |
| 2014/0122085 A1 | 5/2014 | Piety et al. | |
| 2014/0129688 A1 | 5/2014 | Asenjo et al. | |
| 2014/0229055 A1 * | 8/2014 | Itoi | H04Q 9/00 701/31.5 |
| 2014/0324300 A1 * | 10/2014 | Halder | G01S 19/49 701/50 |
| 2015/0006616 A1 * | 1/2015 | Walley | H04L 67/16 709/203 |
| 2015/0112640 A1 * | 4/2015 | Niro | G01D 15/00 702/183 |
| 2015/0310723 A1 * | 10/2015 | Pinkerton | G08B 21/182 340/870.09 |

\* cited by examiner

SENSOR HUB COMPRISING A ROTATION ENCODER

CROSS-REFERENCE TO RELATED APPLICATION

The instant application claims the benefit of Provisional U.S. Patent Application Ser. No. 61/979,025 entitled "Rotary Encoder with Embedded Condition Monitoring System" and filed Apr. 14, 2014, the teachings of which are incorporated herein by this reference.

FIELD

The instant disclosure relates generally to condition monitoring systems and, in particular, to rotation detection sensors and condition monitoring system based on such sensors.

BACKGROUND

Machine condition monitoring generally concerns the use of various types of sensors and data analysis to assess the operating state of various types of machinery. Through the detection of trends, specific patterns or anomalous data from such sensor readings, atypical machine operation may be addressed, potentially before failure of the relevant machinery. In this manner, costly breakdowns can be avoided.

A particular subset of machine condition monitoring concerns various types of machines having rotating components. For example, a machine having a rotating shaft or the like typically employs one or more bearing assemblies. A common problem for such equipment is the eventual degradation and ultimate failure of such bearings. Condition monitoring systems as applied to rotating components often rely on the use of rotation detection sensors, also called rotary encoders or shaft encoders (hereinafter rotation sensors), that are common electro-mechanical devices that convert the angular position or motion of a shaft or axle to an analog or digital code. Such systems often employ other types of sensors to detect vibrations, temperature, etc. of the machinery being monitored. The resulting collection of sensor data may be analyzed according to various well-known techniques to assess, and possibly predict the imminent failure of, the rotating components.

Even though condition monitoring systems have been used for a number of years, the attendant cost of, or difficulty deploying, such systems is often prohibitive for many applications. As a result, many systems must rely on in-person audits rather than real time continuous monitoring. Consequently, machinery may go for relatively extended periods of time without any type of monitoring and, accordingly, the likelihood of untimely failure cannot be mitigated.

Thus, condition monitoring solutions that are both cost-effective and comparatively easy to deploy would represent a welcome advance in the art.

SUMMARY

The instant disclosure describes an apparatus or sensor hub comprising a rotation sensor and a wireless communication module each operatively connected to a processing device. The rotation sensor is deployed to monitor rotation of a component of a monitored machine. The rotation sensor and processing device are configured to receive power from a controller of the monitored machine. The processing device is further configured to receive rotation sensor data from the rotation sensor and thereafter send speed data, position data or both, based on the rotation sensor data, to an external processing device via the wireless communication module. In an embodiment, the rotation sensor, wireless communication module and the processing device may be disposed within a single housing. In another embodiment, the rotation sensor is disposed in a first housing and the wireless communication module and the processing device are disposed within a second housing. In this embodiment, a first connector is mounted on the first housing and a second connector, complementary to the first connector, is mounted on the second housing. When the first and second connectors are coupled together, power from the controller as well as the rotation sensor data is passed through the first and second connectors to the processing device. In yet another embodiment, the sensor hub comprises a signal path that is independent of the processing device and wireless communication module, which signal path is configured to provide the rotation sensor data to the controller of the monitored machine.

One or more additional sensors, which may be associated with the monitored machine or another machine, may also be operatively connected to the processing device. In an embodiment, the additional sensors may comprise any one or more of, or any combination of, an accelerometer, a temperature sensor, an acoustic sensor, an high frequency sensor, an humidity sensor, a barometric pressure sensor, a current sensor or a proximity sensor.

The wireless communication module may support an ad hoc wireless communication protocol. Further, the wireless communication module may receive additional sensor data from one or more wireless sensor nodes associated with the monitored machine or another machine and then send the additional sensor data to the external processing device.

In an embodiment, the processing device comprises a time stamp module that is operative to provide time stamps, which time stamps can be sent by the processing device to the external processing device via the wireless communication module. Furthermore, the processing device may be configured to perform various data operations on the rotation sensor data. Thus, for example, the processing device may comprise a speed calculation module and/or a position calculation module that is/are respectively operative to calculate speed data and/or position data based on the rotation sensor data. Further, the processing device may operate in various modes when sending data to the external processing device. For example, the processing device may automatically and periodically send the data. Alternatively, the sensor hub may be further equipped with an user interface operatively connected to the processing device, whereby a user of the sensor hub can provide user input data that causes the processing device to send the data. Further still, the processing device may be configured to send data based on a change in an operative state of the monitored machine relative to a threshold.

A system may comprise a sensor hub as disclosed herein along with a wireless access point in wireless communication with the wireless communication module of the sensor hub. At least one wireless sensor node, associated with the monitored machine or another machine, may be in wireless communication with the sensor hub (via the wireless communication module) or with the wireless access point. The system may further comprise the external processing device, which may be configured to associate the speed data, position data or both with additional sensor data from the at least one wireless sensor node. Such association of the speed/position data with the additional sensor data may be accomplished on the basis of information at the external processing device concerning association of the at least one wireless sensor node with the monitored machine.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
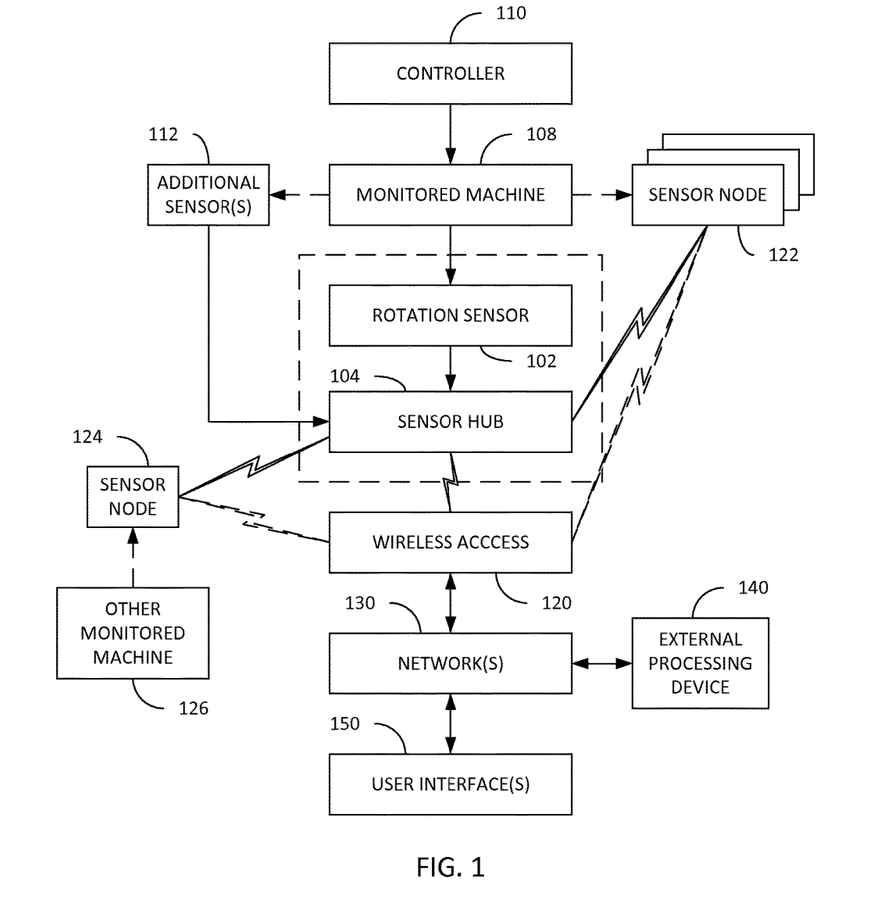
FIG. 1 is a block diagram of a system in accordance with the instant disclosure.

Referring now to FIG. 1, a system 100 is illustrated comprising a rotation sensor 102 and sensor hub 104 operatively connected to each other. Although illustrated as separate components in FIG. 1, the rotation sensor 102 and sensor hub 104 may be disposed within a single housing 106 as described in further detail below. The rotation sensor is operatively coupled to a machine being monitored, i.e., monitored machine 108, having a rotating component. For example, the monitored machine 108 may comprise a motor, a bearing, industrial equipment coupled to such motors and bearings, etc. The instant disclosure is not limited in this regard. As further known in the art, such machines 108 are typically operatively coupled to a controller 110 that dictates operation of the monitored machine 108. As used herein, the controller 110 includes not only the device used to drive operation of the monitored machine 108, but also any power source that typically may be enclosed within the same enclosure as the controller 110. Such controllers are well-known in the art and need not be described in further detail herein.

In addition to the rotation sensor 102, the sensor hub 104 may be operatively connected to one or more additional sensors 112 that are associated with the monitored machine 108. As used herein, a sensor is "associated" with a monitored machine in the sense that the sensor is in sufficient contact or proximity to perform its sensing function on the monitored machine. The additional sensor(s) 112 may comprise any of a number of well-known types of sensors. For example, the additional sensors may comprise any one or more of, or any combination of, an accelerometer, a temperature sensor, an acoustic sensor, an high frequency (e.g., ultrasonic) sensor, an humidity sensor, a barometric pressure sensor, a current sensor or a proximity sensor. Once again, the instant disclosure is not limited in this regard. As described in further detail below, the sensor hub 104, being operatively connected to or integrated with the rotation sensor 102, facilitates the temporal association of such additional sensor data with speed/position data based on rotation sensor data, which data may then be collectively analyzed. For example, to the extent that the rotation sensor 102, sensor hub 104 and additional sensor(s) 112 can be coupled to the monitored machine 108 at the inception of the monitored machine 108, data "signatures" based on the sensor data can be established and stored for later use and comparison with subsequently obtained sensor data.

The sensor hub 104 may wirelessly communicate with a wireless access point 120 that, in turn, can communicate with an external processing device 140 via one or more intervening networks 130. The network(s) 130 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the network(s) 130 need not be a wired network only, and may comprise wireless network elements as known in the art.

As further shown in FIG. 1, sensor nodes 122, 124 may also be provided in the system 100. Each sensor node 122, 124 comprises one or more sensors (such as those described above) and are each capable of wirelessly communicating with sensor hub 104 or, when possible (as illustrated by the dashed communication paths), directly with the wireless access point 120. In this manner, additional sensor data obtain from a given node's sensor(s) may be provided to the sensor hub 104 or relayed via the wireless access point 120, as described in further detail below. As shown, one or more of the sensor nodes 122 may be associated (as defined above) with the monitored machine 108. Alternatively, other sensor nodes 124 may be associated with another monitored machine 126, i.e., a machine other than the one operatively connected to the rotation sensor 102. In an embodiment, the other monitored machine 126 may be operatively coupled to the first monitored machine 108, as in the case, for example, of a pump (i.e., the other monitored machine 126) being driven by a motor (i.e., the first monitored machine 108) via a bearing (i.e., yet another monitored machine 126). In such instances, the layout and configuration of the various machines 108, 126 may make it difficult to employ the additional sensors 112 (having direct, wired connections to the sensor hub 104) for monitoring of the other monitored machines 126 or even other components of the first monitored machine 108. In these instances, the ability of the sensor nodes 122, 124 to communicate wirelessly with the sensor hub 104 allows the sensor hub 104 to act as a gateway for the sensor nodes 122, 124 to the external processing device.

To this end, the sensor hub 104, wireless access point 120 and sensor nodes 122, 124 preferably implement a communication protocol supporting the formation of a so-called wireless ad hoc network. As known in the art, a wireless ad hoc network permits all devices in the network to wirelessly communicate with other devices within range of each other (i.e., in peer-to-peer fashion). For example, the Institute of Electrical and Electronics Engineers (IEEE) 802.11 standards are an example of suitable protocol that may be used for this purpose (as embodied in "WI-FI" local area networking products).

As noted previously, the sensor hub 104 communicates with the external processing device 140 via the network(s) 130. In an embodiment, the external processing device 140 may comprise a so-called cloud based computing platform, i.e., one or more remote processing devices such as server computers or the like capable of performing desired analyses on the data provided by the sensor hub 104 and wireless access point. For example, the external processing device 140 may perform Fast Fourier Transform (FFT) analysis on the received data in order to identify the occurrence of anomalous frequencies in the operation of any of the monitored machines 108, 126. Those having skill in the art will appreciate that a wide variety of such analyses or other data operations may be performed on the data obtained from the deployed sensors, and the instant disclosure is not limited to any particular types of data processing.

In an embodiment, the external processing device 140 may also comprise information associating the monitored machine with other machines, as in the case of a parent/child relationship. That is, the information maintained by the external processing device 140 may indicated that a given motor is associated with a bearing and pump that are driven by the motor. Such relational information may be provided to the external processing device 140 when the monitored machine and other machines are first deployed or upon a change in configuration between such machines. In this manner, any data provided by the sensor hub 104 to the external processing device 140 may be associated with not only the monitored device, but also any other machines (monitored or otherwise) thus related to the monitored device. Alternatively, or additionally, the external processing device 140 may also maintain information associating given sensor nodes with a monitored machine or those other machines associated with the monitored machine. Again, in this manner, the sensor data obtained from sensor nodes may thereby be stored in relation to the monitored machine and the other machines associated therewith.

As further shown, and in keeping with a cloud based computing approach, one or more user interfaces 150 may communicate with the external processing device 140 via the network(s) 130 in order to obtain access to the obtained sensor data and/or results of the various data operations performed by the external processing device 140. For example, the user interface(s) 150 may be implemented using well-known web browser techniques and the external processing device 140 may comprise a suitable web server configured to support any desired graphical user interfaces used for data presentation via the web browser.

Figure 2:
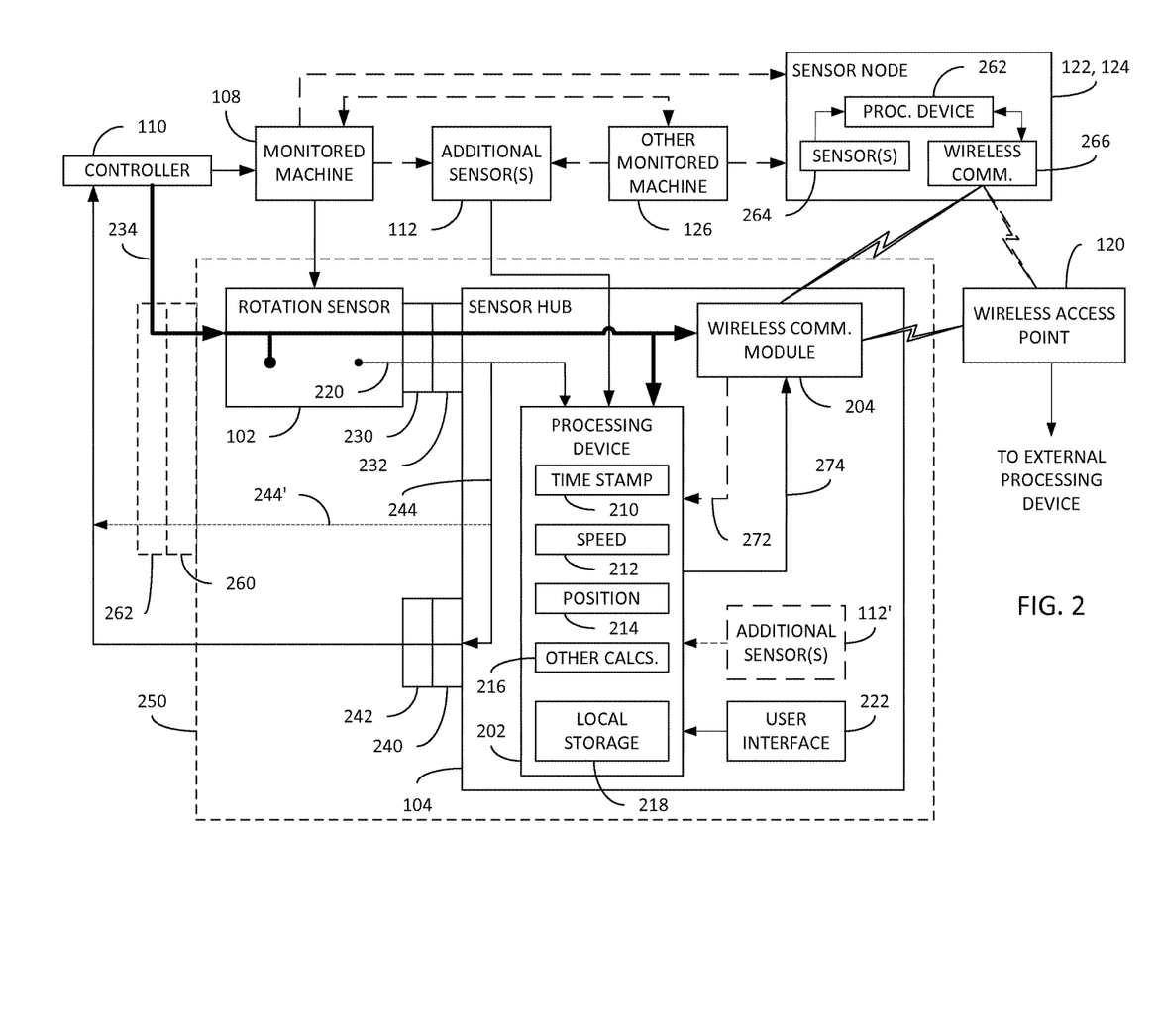
FIG. 2 is a block diagram of illustrating, in greater detail, a sensor hub and a sensor node in accordance with the instant disclosure.

Referring now to FIG. 2, various elements of the system 100 are illustrated in greater detail. As in FIG. 1, the rotation sensor 102 and sensor hub 104 are further illustrated. In particular, the sensor hub 104 comprises a processing device 202 and a wireless communication module 204. The processing device 202 may comprise may comprise one or more of a microprocessor, microcontroller, digital signal processor, co-processor or the like or combinations thereof capable of executing instructions stored on one or more suitable storage device (e.g., volatile or non-volatile memory). Alternatively, or additionally, the processing device 202 may be embodied using other processing-capable hardware as in the case of a programmable logic controller, application specific integrated circuit, etc. In an embodiment, the processing device 202 may be embodied as a so-called data acquisition board, a suitable example of which includes a BeagleBone Black, Rev. C development board available through Arrow Electronics (part no. BB-BBLK-000). The processing device 202 is operatively connected to the wireless communication module 204. The wireless communication module 204 supports wireless communication between the sensor hub 104 and other wireless devices, i.e., the wireless access point 120 and/or sensor nodes 122, 124. In an embodiment, the wireless communication module may comprise a commercially available "WI-FI" module such as the Wireless N USB Adapter TL-WN727N available through TP-LINK Technologies.

As shown, the processing device 202 may comprise a number of functional modules 210-216 as well as local data storage 218. For example, the processing device 202 may implement a time stamp module 210 that provides time stamps used to record when events occur relative to a time base maintained by the processing device 202. In the case of the BeagleBone Black development board, all-digital phase locked loops may be synchronized to a master clock (e.g., within the external processing device 140) to provide a common time base from which time stamps may be derived using well-known techniques. As sensor data is acquired by the sensor hub 104, a time stamp may be generated by the time stamp module 210 to mark the arrival of the sensor data at the sensor hub 104. In this manner, longitudinal data analyses of sensor data may be provided, or otherwise disparate sensor data, e.g., speed/position data and temperature sensor data, may be temporally aligned with each other, thereby permitting a more complete "picture" of the operational state of a particular monitored machine at a given point in time.

The processing device 202 may further implement a speed calculation module 212 and a position calculation module 214. The speed calculation module 212 and the position calculation module 214 respectively determine speed data and position data based on rotation sensor data 220 received from the rotation sensor 102. Various techniques for calculating speed and position data based on rotation sensor data are well-known in the art and are dependent upon the format of the rotation sensor data. For example, where the rotation sensor 102 comprises an incremental encoder, the rotation sensor data will typically comprise two quadrature square-wave outputs referred to as A and B, as well as a positional output, referred to as Z. As known in the art, by sampling the A and B outputs, a series of two-bit binary values may be derived and, by observing the progression of the binary values, it is possible to determine the direction of rotation and, based on the rate of change of the binary values, the rotational speed. Further, using the Z output, the position of the measured component may be determined relative to a "home" position of the rotation sensor. Again, various other techniques for such speed and position determination are well-known in the art dependent upon the nature of the rotation sensor being used.

As further shown, the processing device 202 may implement various other calculation 216 based on sensor data (not just rotation sensor data) received by the processing device 202. For example, the other calculations module 216 may compute FFT results, root mean square (RMS) values, peak values, etc. Once again, techniques for performing such calculations based on sensor data are well-known in the art. In an embodiment, the results determined by any of the calculation modules 212-216 may be associated with one or more time stamps generated by the time stamp module 210. By having such calculations performed by the processing device 202 and then transmitting only the results therefrom, it is possible to reduce the amount of data that must be transmitted by the wireless communication module 204.

The local storage 218 may comprise one or more storage devices that may be used to temporarily store any sensor data (and corresponding time stamps) received by the processing device 202 or any of the results determined by the calculation modules 212-216. This may be particularly desirable for those instances in which the wireless link between the wireless communication module 204 and the wireless access point 120 is intermittent or unavailable, i.e., the data may be stored for later uploading when the link is active and available.

As noted above, one or more additional sensors 112 may be operatively connected to the sensor hub 104 and, in the illustrated embodiment, the additional sensor(s) 112 are coupled to corresponding input port(s) of the processing device 202. While the connection types will vary by sensor, a high density cable/connector standard will typically be employed for this purpose. Further, the additional sensors 112 may be provided with wireless capability such as Low Power Wide Area Wireless Access Network (LPWAN) transmitters or other similar wireless technologies that permit them to communication with the processing device 202. Further, it may be desirable to optionally deploy such additional sensors 112' within or integrated with the sensor hub 104, as shown, thereby reducing or limiting the need for additional external connections.

Finally, the sensor hub 202 may comprise an user interface 222 whereby inputs from and outputs to a user of the sensor hub 202 may be provided. For example, the user interface 222 may comprise any combination of well-known input (e.g., a multi-function button or combination of buttons, a keyboard, a mouse, a touch screen, microphone and suitable voice recognition application, etc.) and/or output (e.g., liquid-crystal display (LCD), light-emitting diode (LED) display, speakers, status lights, etc.) mechanisms. Via the user interface 222, a user of the sensor hub 104 may provide user input data (e.g., signals indicative of the selection of one or more specific user input mechanisms) to the processing device 202 and, similarly, information may be provided to the user. For example, in an embodiment, a user may be provided with a menu of possible status indications for the monitored machines 108, e.g., "maintenance commencing" or "maintenance completed." Upon selection by the user of one of the status indications, the processing device 202 may obtain sensor data from one or more of the various sensors 102, 112, 112', 122, 124 available to it, thereby creating a record of the various sensor readings at the time of selection of the particular status indicator. In this manner, sensor data may be correlated with particularly meaningful events relative to the monitored machine 108. Those having skill in the art will appreciate that the user interface 222 may be employed for other, similar purposes concerning operation of the sensor hub 104.

In the illustrated embodiment, the rotation sensor 102 and sensor hub 104 are deployed within separate housings, with each separate housing having a complementary, mating connectors 230, 232 mounted thereon. The connectors 230, 232 may comprise sealed, industrial connectors such as "HEAVY|MATE" heavy duty connectors available from Amphenol Corporation. As illustrated, the connectors 230, 232 include a signal path that permits the rotation sensor data 220 generated by the rotation sensor 102 to be conveyed to the processing device 202. Furthermore, one or more power signals 234 (shown as a heavy lines) used to supply electrical power to the rotation sensor 102 are also routed through the connectors 230, 232 from the rotation sensor 102 to the sensor hub 104, which in turn are used to supply electrical power to the various components of the sensor hub 104, i.e., the processing device 202 and wireless communication module 204. For example, the power signal(s) 234 may comprise a common (or ground) signal and a positive voltage signal. In an embodiment, the power signal(s) 234 are derived from the machine controller 110, as shown. Although not shown in FIG. 2, the power signal(s) 234 may subjected to signal conditioning (e.g., rectifier circuitry, voltage regulators, etc.) prior to supplying the various components of the sensor hub 104.

As further shown, an additional connector 240 may be mounted on the housing of the sensor hub 104, thereby permitting output signals to be provided back to the controller 110 via another complementary, mating connector 242. In an embodiment, the rotation sensor data 220 is provided back to the controller 110 via a signal path 244 that is independent of processing device 202 and wireless communication module 204. In an embodiment, line drivers or the like (not shown) may be used to further condition the electrical signals representations of the rotation sensor data 220. As known in the art, the rotation sensor data 220 may be used by the controller 110 to control operation of the monitored machine 108. By providing a separate signal path 244 for the rotation sensor data 220 to be provided to the controller 110, any failures of the processing device 202 or wireless communication module 204 will not affect the availability of such data to the controller 110.

Figure 3:
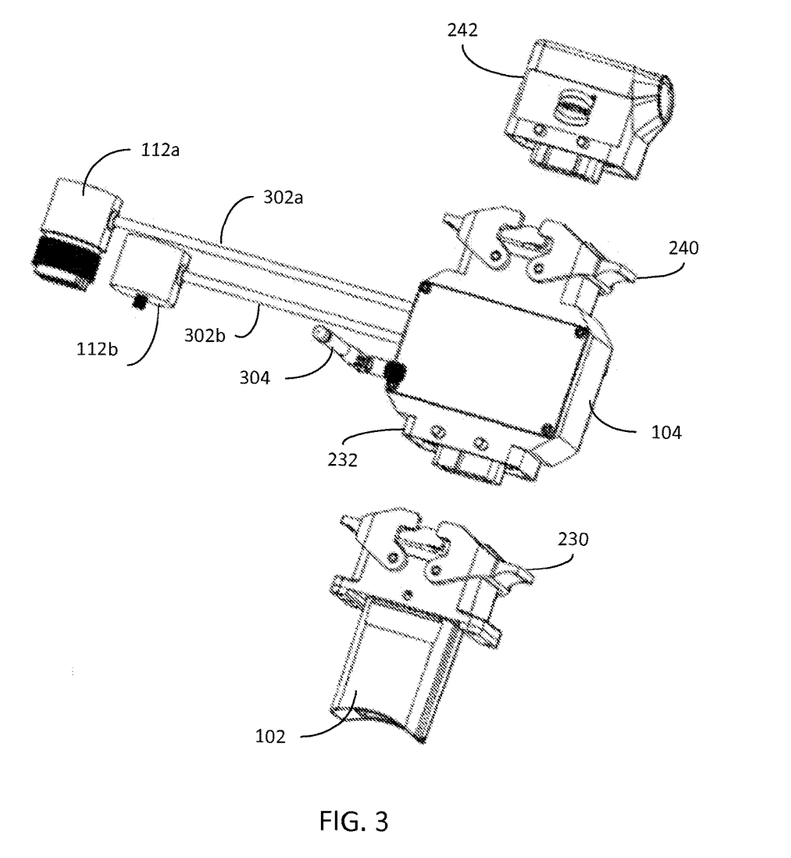
FIG. 3 illustrates an embodiment of a sensor hub and rotation sensor in accordance with the instant disclosure.

A particular implementation of a two-housing embodiment of the instant disclosure is further illustrated with reference to FIG. 3. In particular, the rotation encoder 102 may comprise a first housing upon which the connector 230 is mounted. The rotation sensor 102 and connector 230 illustrated in FIG. 3 comprises a "RIM TACH" 8500 rotary encoder available through the Dynapar Corporation of Gurnee, Ill. In turn, the sensor hub 104 comprises a substantially rectangular housing having a first connector 232 mounted thereon, which first connector is complementary to and may be mated with the connector 230 of the rotation sensor 102. A second connector 240 is also mounted on the sensor hub housing, which second connector 240 may likewise be coupled with another corresponding connector 242, as described above. As further shown, two additional sensors 112a, 112b, e.g., accelerometers, are coupled to the sensor hub 104 via corresponding cables 302a, 302b. Further still, a suitable antenna 304 is mounted on the sensor hub housing, which antenna 304 is operatively connected to the wireless communication module 204 (not shown in FIG. 3).

With reference once again to FIG. 2, In an embodiment, both the rotation sensor 102 and the components of the sensor hub 104, i.e., the processing device 202 and the wireless communication module 204, may be disposed within a single housing 250 rather than two separate housings as described above. In this case, a single connector 260 is mounted on the housing 250, with the return signal path 244' for the rotation sensor data 220 being routed through the single connector 260 and a complementary, mating connector 262 coupled to the controller 110. Further in this case, the connector pairs 230, 232, 240, 242 illustrated in the above-described two-housing embodiment would not be required and any of the relevant signals conveyed thereby could instead be conveyed via conventional inter-components cabling or the like.

FIG. 2 further illustrates a single sensor node 122, 124. As noted above, the sensor node 122, 124 may be associated with the monitored machine 108 or another monitored machine 126, as illustrated by the dashed arrows. (Note that the additional, bi-directional dashed arrow between the monitored machine 108 and the other monitored machine 126 illustrates the potential operative coupling between the two machines 108, 126.) As shown, the sensor node 122, 124 may comprise a node processing device 262 operatively coupled to one or more additional node sensors 264 and a node wireless communication module 266. The additional node sensor(s) 264 may comprise sensors of the same type as the additional sensor(s) 112 described above. Likewise, the node processing device 252 and node wireless communication module 266 may be substantially similar in construction and operation as the processing device 202 and wireless communication module 204 in the sensor hub 104. In contrast to the sensor hub 104, the various components within the sensor node 122, 124 may be battery powered (not shown). In an embodiment, the node wireless communication module 266 may receive additional sensor data from the node sensor(s) 264 and node processing device 262, which data is then transmitted by the node wireless communication module 266 to the wireless communication module 204 of the sensor hub 104. In turn, the additional sensor data 272 received by the wireless communication module 204 is provided to the processing device 202, which is thereafter treated like any other sensor data handled by the processing device 202.

In an alternative embodiment, and in keeping with the embodiment in which the various wireless modules 204, 266 and wireless access point 120 support implementation of a wireless ad hoc network, the node wireless module 266 may communicate directly with the wireless access point 120 whenever possible, as illustrated by the dashed communication link.

Regardless of how it is obtained, any of the sensor data, time stamps or calculation results (collectively referred to herein as upload data 274) may be provided by the processing device 202 to the wireless communication module 204 for transmission to the wireless access point 120, and subsequent retransmission to the external processing device, as described above. The timing of transmissions of upload data 274 may be accomplished in a number of ways. In a first embodiment, the processing device 202 is programmed to automatically and periodically send the upload data 274. The periodicity of this operation may be user adjustable via the user interface 222. In a typical scenario, the periodicity may be selected anywhere from one second to one day, though it is understood that even shorter or longer periods could be employed. In another embodiment, the provision of certain user inputs (e.g., via the user interface 222) may cause the processing device to transmit upload data 274. An example of this was described above relative to instances of initiating and completing certain maintenance tasks on a monitored machine. More generally, such user inputs may be considered as asynchronous requests to transmit the upload data 274, which requests may be made for any of a number of reasons, e.g., when the machine is initially deployed, after the reconfiguration of the monitored machine, before/after alignment or lubrication, during machine run-up or run-down, etc.

In yet another embodiment, the processing device 202 may be operative to continually assess the various sensor data inputs (or calculated results based thereon) and compare such data (or results) against various thresholds. For example, when speed data for a given monitored machines drops below a lower threshold or exceeds an upper threshold, this change in operative state may be used to trigger a transmission of upload data. Other sensor data could be incorporated into such a determination as well. As a further example, a change in measured vibrations exceeding a threshold, coupled with no change in speed beyond another threshold, could be used to trigger an upload of data and/or change the rate at which data is uploaded.

Figure 4:
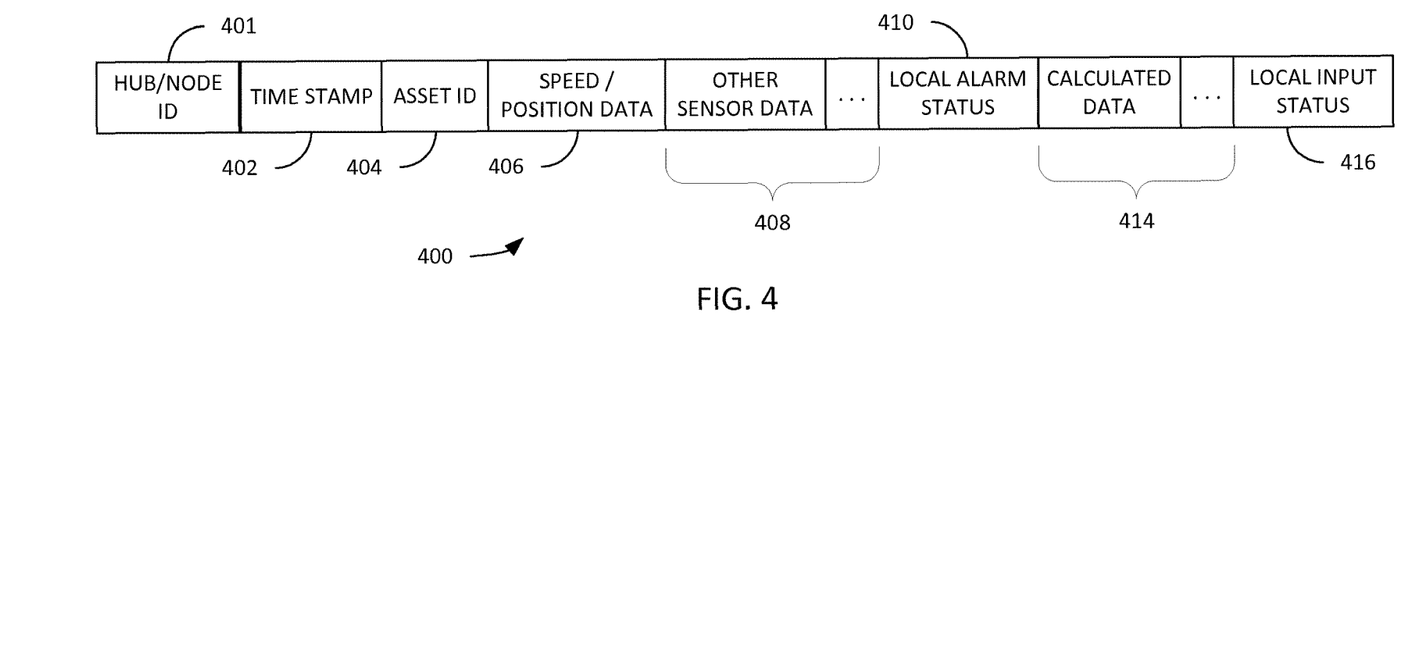
FIG. 4 illustrates a data structure in accordance with the instant disclosure.

In an embodiment, the upload data 274 (or the additional sensor data transmitted by the sensor node(s) 122, 124) may be transmitted to the wireless access point 120 in packet form, a particular example of which is further illustrated in FIG. 4.

In the embodiment illustrated in FIG. 4, each data packet 400 may comprise a number of data fields 401-416 as shown. It should be noted that, although a particular order of the fields 401-416 is shown, this is not a requirement. Thus, each data packet may comprise a hub/node identification (ID) 401 which includes data uniquely identifying the particular sensor hub 104 or sensor node 122, 124 (in the case of direct communication with the wireless access point 120). Further, each packet includes a time stamp 402 as generated by the time stamp module 210, described above. Note that the data provided in the remaining fields 404-416 illustrated in FIG. 4 are thereafter associated with that particular time stamp. That is, the data contained in a particular packet having a given time stamp value is thereafter temporally aligned relative to all other data found in other data packets having similar, but differently-valued time stamps.

Regardless, following the time stamp, an asset identification (ID) 404 may be provided. In an embodiment, the asset ID 404 may comprise data that uniquely identifies the particular monitored asset 108 with which the rotation sensor 102 and sensor hub 104 is associated. Thereafter, the packet may include speed or position data or both 406. Thereafter, the packet 400 may include one or more fields comprising other sensor data 408, which may include the sensor data obtained from any of the additional sensors 112, 112', 264 described above. For example, this may include any vibration data (i.e., accelerometer sensor data), temperature data, etc. Furthermore, in the case of a battery-powered sensor node, the other sensor data 408 may also include an indication of battery status (e.g., an estimate of battery health based on a given voltage and time model) for a particular sensor node.

As illustrated, the packet 400 may further include indications of any local alarm status 410. In an embodiment, the processing device 202 may be operative to assess any of the upload data 274 prior to its transmission relative to one or more alarm conditions programmed into the processing device 202. For example, if the processing device 202 detects a zero rotation speed for the monitored device 108, this may be sufficient to cause the generation of an alarm that may be subsequently provided via the local alarm status indicator 410. Those having ordinary skill in the art will appreciate that various other alarm conditions may be defined as a matter of design choice, particularly dependent upon the particular machine being monitored as well as its particular deployment.

As further shown, the packet 400 may include any calculated data 414 as described above, e.g., FFT results, RMS and/or peak values, etc. Further still, as noted above, the user interface 212 may be operated to select particular events relevant to the monitored machine 108. A local input status field 416 may be provided to reflect any particular selections made in this manner.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. An apparatus comprising:
 a rotation sensor configured to receive power from a controller of a monitored machine;
 a wireless communication module;
 a processing device, operatively connected to the rotation sensor and the wireless communication module, configured to receive the power from the controller of the monitored machine and to receive unprocessed sensor data directly from the rotation sensor and calculate speed and/or relative position and allow the unprocessed rotation sensor data to travel on to the controller unchanged for purpose of deterministic control of the machine and machine diagnostic sensor data to be gathered and sent, to an external processing device via the wireless communication module;

a signal path, independent of the processing device and wireless communication module, configured to provide only the directly obtained unprocessed rotation sensor data to the controller of the monitored machine whereby failure of the wireless communication module or the processing device will not prevent provision of the rotation sensor data to the controller and wherein speed and relative position data are time stamped, but only for the purposes of realignment with other time stamped data for trend analysis.

2. The apparatus of claim 1, wherein the rotation sensor, the wireless communication module and the processing device are disposed within a single housing.

3. The apparatus of claim 1, further comprising:
a first housing having the rotation sensor disposed therein;
a first connector mounted on the first housing, wherein the rotation sensor is operatively connected to the first connector;
a second housing having the wireless communication module and the processing device disposed therein; and
a second connector, complementary to the first connector and mounted on the second housing, wherein the processing device is operatively connected to the second connector,
and wherein the power from the controller of the monitored machine and the rotation unprocessed sensor data from the rotation sensor is conveyed from the first connector to the second connector and the processing device where it is summarized as speed and relative position.

4. The apparatus of claim 1, further comprising:
at least one additional sensor associated with the monitored machine or another machine and operatively connected to the processing device,
wherein the processing device is configured to receive additional sensor data from the at least one additional sensor and send the additional sensor data to the external processing device via the wireless communication module.

5. The apparatus of claim 4, wherein the at least one additional diagnostic sensors comprises any one or more of, or any combination of, an accelerometer, a temperature sensor, an acoustic sensor, a high frequency sensor, a humidity sensor, a barometric pressure sensor, a current sensor or a proximity sensor.

6. The apparatus of claim 1, wherein the processing device further comprises a time stamp module operative to provide time stamps, and wherein the processing device is operative to send the time stamps to the external processing device via the wireless communication module.

7. The apparatus of claim 1, wherein the processing device further comprises a speed calculation module operative to calculate the speed data based on the rotation sensor data.

8. The apparatus of claim 1, wherein the processing device further comprises a position calculation module operative to calculate the position data based on the rotation sensor data.

9. The apparatus of claim 1, wherein the wireless communication module supports an ad hoc wireless communication protocol.

10. The apparatus of claim 1, wherein the wireless communication module is operative to wirelessly receive additional diagnostic sensor data from a wireless diagnostic sensor node associated with the monitored machine or another machine and wirelessly send the additional diagnostic sensor data to the external processing device.

11. The apparatus of claim 1, wherein the processing device is operative to automatically and periodically send the speed data or position data or both to the external processing device via the wireless communication module.

12. The apparatus of claim 1, further comprising:
a user interface operatively connected to the processing device, wherein user input data via the user interface causes the processing device to send the speed data or position data or both to the external processing device via the wireless communication module.

13. The apparatus of claim 1, wherein the processing device is operative to send the speed data or position data or both to the external processing device via the wireless communication module responsive to a change, relative to a threshold, in an operative state of the monitored machine.

14. A system comprising:
a sensor hub comprising a rotation sensor configured to receive power from a controller of a monitored machine, a wireless communication module, and a processing device configured to receive the power from the controller of the monitored machine and operatively connected to the rotation sensor and the wireless communication module, the sensor hub further comprising a signal path, independent of the processing device and wireless communication module, configured to provide only unprocessed rotation sensor data to the controller for the sole purpose of deterministic control of the monitored machine whereby failure of the wireless communication module or the processing device will not prevent provision of the rotation sensor data to the controller; and
a wireless access point in wireless communication with the wireless communication module and operatively connected to an external processing device,
wherein the processing device is operative to receive rotation sensor data from the rotation sensor and send speed data or position data or both, based on the rotation sensor data, to the external processing device via the wireless communication module and the wireless access point.

15. The system of claim 14, further comprising:
a wireless sensor node in wireless communication with the sensor hub via the wireless communication module or with the wireless access point,
wherein the wireless sensor node is associated with the monitored machine or another machine.

16. The system of claim 14, further comprising the external processing device.

17. The system of claim 16, further comprising:
at least one wireless sensor node associated with the monitored machine or another machine and in wireless communication with wireless communication module or the wireless access point,
wherein the processing device or wireless access point is configured to receive additional sensor data from the at least one wireless sensor node and send the additional sensor data to the external processing device,
and wherein the external processing device is configured to associate the speed data or position data or both with the additional sensor data.

18. The system of claim 17, wherein the external processing device comprises information associating the at least one wireless sensor node with the monitored machine.

* * * * *